3,455,933
THIAZOLO AND THIAZINO ISOQUINOLINE DERIVATIVES
Minas P. Georgiadis, Chomedey, Quebec, and Leslie G. Humber, Dollard des Ormeaux, Quebec, Canada, assignors to American Home Products Corporation, New York, N.Y., a corporation of Delaware
No Drawing. Filed Nov. 15, 1966, Ser. No. 594,404
Int. Cl. C07d 91/42, 93/00; A01n 9/22
U.S. Cl. 260—289                                  1 Claim

ABSTRACT OF THE DISCLOSURE

There is disclosed herein the preparation of the compounds 2,5,6-trihydro-3H,10bH-thiazolo[2,3-a]isoquinolin-3-one, of its 8,9-dimethoxy derivatives, and of their respective 1,1-dioxides, as well as the preparation of 2,3,6,7-tetrahydro-4H,11bH-[1,3]-thiazino[2,3-a]isoquinolin-4-one, of its 9,10-dimethoxy derivative, and of their respective 1,1-dioxides. Those compounds are pharmacologically active and are useful as antibacterial, trichomonicidal, and anticonvulsant agents. A process for preparing the above compounds, and formulations for the pharmacological use thereof, and also given.

---

This invention relates to novel thiazolo and thiazino derivatives of isoquinolines with useful biological properties. These compounds may be represented by the formula:

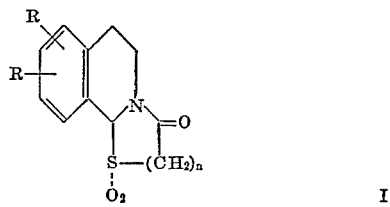

The dotted line extending from the sulfur atom in the 1-position indicates that, optionally, two atoms of oxygen may either be present or absent. Where two atoms of oxygen are present the compounds are 1,1-dioxides, whereas when absent, the compounds are derivatives of thiazolo[2,3-a]isoquinolin-3-one and of thiazino[2,3-a]isoquinolin-4-one.

Since our invention includes these two types of compounds, they will be represented by the formulae

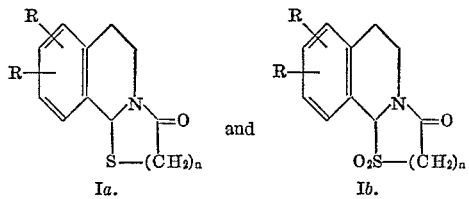

wherein R is selected from the group which consists of hydrogen and methoxy and $n$ represents an integer of from one to two.

The compounds of this invention possess antibacterial and trichomonicidal activities, and are useful as antibacterial and trichomonicidal agents for topical application. As antibacterial agents, they are effective against certain gram-positive and gram-negative organisms such as, for example, *Staphylococcus pyogenes* (both penicillin-sensitive and penicillin-resistant strains), *Sarcina lutea*, *Streptococcus faecalis*, *Escherichia coli*, *Salmonella pullorum*, *Proteus mirabilis*, and *Proteus vulgaris*. They may be used in ointments, creams, or lotions containing from 0.1–1% of the active ingredient, for topical application.

As trichomonicidal agents, the compounds of this invention are active against *Trichomonas vaginalis* and *Trichomonas foetus*, and may be formulated in the form of vaginal inserts or creams containing from 0.05–1% of the active ingredient, for topical application.

The compounds of this invention possessing the thiazole ring system also show anticonvulsant activity as evidenced by their ability to inhibit seizures caused by electroshock. As anticonvulsants, they may be formulated with suitable excipients such as, starch, lactose, and magnesium stearate, in the form of tablets or capsules containing from 100–250 mg. of the active ingredient per dosage form, and may be administered in divided doses from 2–4 times per day.

More specifically, we prefer to prepare the compounds of this invention in the following manner. 3,4-dihydroisoquinoline, or a methoxylated derivative thereof, is prepared as described by Snyder and Werber in J. Am. Chem. Soc., vol. 72, p. 2965 (1960) and by Späth and Polgar in Monatsh f. Ch. vol. 51, p. 195, 1929) heated in solution in a water-immiscible aromatic solvent such as, for example, benzene, or toluene, with one molar equivalent of mercaptoacetic or 3-mercaptopropionic acid. The water formed during the course of the reaction is removed by a suitable trap as it is being formed, the solvent is evaporated, the residue is redissolved in a water-immiscible solvent, washed with sodium bicarbonate, dried, evaporated, and the residue crystallized. In this manner, there are obtained the 2,5,6-trihydro-3H,10bH-thiazolo-[2,3-a]isoquinoline-3-ones or the 2,3,6,7-tetrahydro-4H,11bH-[1,3]-thiazino-[2,3-a]isoquinolin-4-ones of Formula I*a*. The latter compounds may be oxidized by treatment with an organic peracid such as, for example, m-chloroperbenzoic acid to yield the corresponding 1,1-dioxides of Formula I*b*.

The following formulae, in which $n$ represents 1 or 2, and R is as defined above, and examples will illustrate this invention.

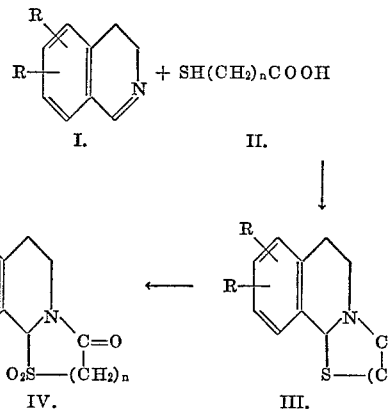

Example 1

3,4-dihydroisoquinoline (32.0 g.) and an equivalent amount of mercaptoacetic acid are refluxed in benzene until the water in the water trap remains at constant volume. The benzene is evaporated under reduced pressure and the residue redissolved in benzene, washed with a saturated solution of sodium bicarbonate and water, and dried over sodium sulfate. After removal, of the solvent the resulting thick syrup yields crystalline material upon addition of a small amount of ethanol. Repeated crystallizations from ethanol yield 2,5,6-trihydro-3H,10bH-thiazolo[2,3-a]-isoquinolin-3-one, M.P. 92–92.5° C.

In the same manner, but using an equivalent amount of 3-mercaptopropionic acid, 2,3,6,7-tetrahydro-4H,11bH-[1,3]-thiazino-[2,3-a]isoquinolin-4-one is obtained with M.P. 78–80° C.

In the same manner, but using 12 g. of 6,7-dimethoxy-3,4-dihydroisoquinoline and an equivalent amount of mercaptoacetic acid, 8,9 - dimethoxy-2,5,6-trihydro-3H,10bH-thiazolo-[2,3-a]isoquinolin-3-one is obtained with M.P. 174.5–175.5° C.

In the same manner as above, but using 4 g. of 6,7-dimethoxy-3,4-dihydroisoquinoline and one equivalent amount of 3-mercaptopropionic acid, 9,10-dimethoxy-2,3,6,7-tetrahydro-4H,11bH - [1,3] - thiazino[2,3-a]isoquinolin-4-one is obtained with M.P. 132.5–133° C.

All the above compounds are identified by elemental analysis and by infrared or n.m.r. spectrography.

Example 2

Two grams of 2,3,6,7-tetrahydro-4H-11bH-[1,3]-thizino-[2,3-a]isoquinolin-4-one are obtained as described in Example 1, are dissolved in methylene chloride and added dropwise to a solution of 4.2 g. m-chloroperbenzoic acid in the same solvent and stirred at room temperature. During the course of the reaction the resulting m-chlorobenzoic acid which precipitates is removed by filtration. After one and one-half hours the solvent is evaporated and m-chlorobenzoic acid is continually removed. The reaction mixture is evaporated and crystallized from ethanol to yield 2,3,6,7-tetrahydro-4H,11bH-[1,3]-thiazino[1,3-a]isoquinolin-4-one-1,1-dioxide, M.P. 163.5–164.5° C.

In the same manner, but using 9,10-dimethoxy-2,3,6,7-tetrahydro-4H,11bH - [1,3]-thiazino[2,3-a]isoquinolin-4-one instead of the above starting material, 9,10-dimethoxy-2,3,6,7-tetrahydro - 4H,11bH - [1,3]-thiazino[2,3-a]isoquinolin-4-one-1,1-dioxide is obtained and characterized by infrared absorption bands at 1332 and 1127 cm.$^{-1}$.

In the same manner, but using 2,5,6-trihydro-3H,10bH-thiazolo-[2,3-a]isoquinolin-3-one as the starting material, 2,5,6-trihydro - 3H,10bH - thiazolo[2,3-a]isoquinolin-3-one-1,1-dioxide is also obtained.

In the same manner, but using 8,9-dimethoxy-2,5,6-trihydro-3H,10bH-thiazolo[2,3-a]isoquinolin-3-one as the starting material, 8,9-dimethoxy-2,5,6-trihydro-3H,10bH-thiazolo-[2,3-a]isoquinolin-3-one-1,1-dioxide is also obtained.

We claim:
1. 2,5,6 - trihydro - 3H-10bH-thiazolo[2,3-a]isoquinolin-3-one.

References Cited

UNITED STATES PATENTS 2,985,649   5/1961   Lombardino et al. _ 260—243 XR

OTHER REFERENCES

Krohnke et al.: Angew. Chem., vol. 73, p. 26 (1961), translation abstract in Chem. Abstracts, vol. 55 col. 13426f (1961).

HENRY R. GILES, Primary Examiner

JOHN M. FORD, Assistant Examiner

U.S. Cl. X.R.

260—243; 424—246, 270